(No Model.)

C. W. NASON.
METHOD OF CLOSING THE ENDS OF METAL TUBES.

No. 331,528. Patented Dec. 1, 1885.

United States Patent Office.

CARLETON W. NASON, OF NEW YORK, N. Y.

METHOD OF CLOSING THE ENDS OF METAL TUBES.

SPECIFICATION forming part of Letters Patent No. 331,528, dated December 1, 1885.

Application filed August 28, 1885. Serial No. 175,535. (No model.)

*To all whom it may concern:*

Be it known that I, CARLETON W. NASON, a citizen of the United States, residing at New York, county of New York, and State of New York, have invented certain new and useful Improvements in the Method of Closing the Ends of Metal Tubes, fully described and represented in the following specification and the accompanying drawings, forming a part of the same.

This invention relates to a method of closing the ends of metal tubes, and particularly of such comparatively small tubes as are employed in the manufacture of steam-radiators.
In closing the ends of tubes for radiators and for similar purposes it has heretofore been customary either to turn in and weld together the edges of the end of the tube by hammering or to subject the end of the tube, when properly heated, to the action of a concave revolving die, which operated to bend or crimp inward and weld together the edges of the end of the tube. The first of these methods is not practicable when the tubes are to be produced in large quantities, because of the expense involved, and the second has not proved entirely satisfactory, because many of the tubes thus produced when put in use were found to be imperfectly closed, and were consequently worthless.

I have found that the ends of metal tubes, and particularly of comparatively small tubes—such as are used for steam-radiators and for similar purposes—can be quickly, cheaply, and perfectly closed by inserting a snugly-fitting disk into the end of the tube which it is desired to close, then heating the end of the tube and the disk to the welding-point, and then submitting the heated end of the tube to the action of rolls, by which it is pressed tightly around the disk, so as to be welded thereto, thus making the disk integral with the tube and perfectly closing the end of the latter.

In order that the invention may be readily understood, it will now be described in detail, reference being had to the accompanying drawings, in which—

Figure 6:
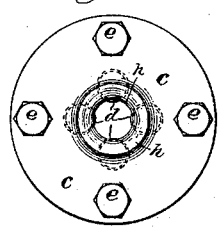
Figure 5:
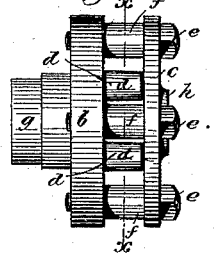
Figure 7:
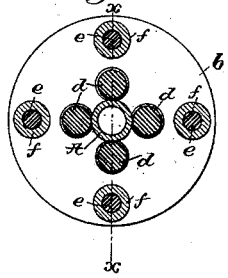
Figure 1:
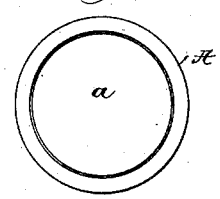
Figure 2:
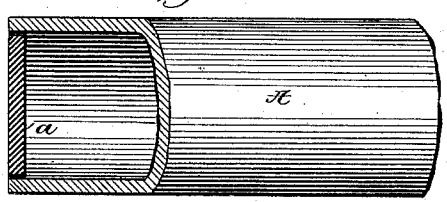
Figure 3:
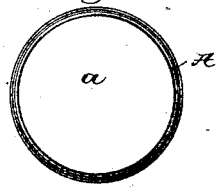
Figure 4:
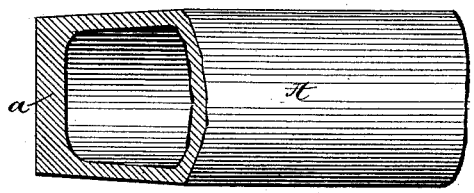

Figure 1 is an end view, and Fig. 2 a side view, partly in section, of a metal tube after the disk has been inserted. Figs. 3 and 4 are similar views of the tube after its end has been closed. Fig. 5 is a side view, and Fig. 6 an end or front view, of one form of apparatus for carrying the invention into practical operation. Fig. 7 is a section taken on the line *x x* of Fig. 5, and Fig. 8 is a section taken on the line *x x* of Fig. 7, illustrating the operation of the apparatus.

Referring to said drawings, it is to be understood that A is an ordinary wrought-iron tube suitable for a steam-radiator, or for other similar purposes, and *a* a plain wrought-iron disk which is inserted into that end of the tube which it is desired to close. The disk *a* is simply a round piece punched out of an ordinary wrought-iron plate of suitable thickness, and is of such size as to be readily inserted in the end of the tube A. The pieces which are punched out of the boiler-plates in the manufacture of steam-boilers, and which ordinarily are of no value, can be readily utilized for this purpose. It is to be remarked that in order to secure the best results the disk *a* should be of the same or very nearly the same thickness as the tube, as otherwise the disk or the tube, whichever is the thinner, will be liable to be burned before the other becomes properly heated for welding. The disk *a* having been inserted in the end of the tube A, as shown in Figs. 1 and 2, the end of the tube and the disk are heated to the welding-point, after which the end of the tube is subjected to the action of suitably-arranged rolls, by which it is pressed around and welded to the disk. In this operation the end of the tube is slightly rolled down, as shown in Figs. 3 and 4, and the disk *a* is slightly reduced in size and correspondingly thickened, as shown in Fig. 4. If preferred, the disk *a* and the end of the tube may be heated separately and the disk inserted into the end of the tube after the heating. This will not, however, be found as convenient or desirable as to heat the disk and tube together.

Figure 8:
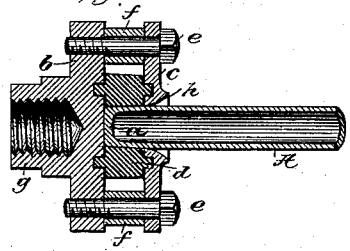

Figs. 5 to 8 illustrate one form of apparatus by which the rolling of the end of the tube onto the disk *a* can be readily accomplished. This apparatus consists of two plates, *b c*, between which are mounted a number (four, as shown in the present case) of small rolls, *d*, which are arranged to turn freely. The plates *b c* are rigidly connected by means of bolts *e*, and are held the proper distance apart by means of interposed washers *f*. The plate *b* is provided with a suitable shank, g, by which it can be attached to the live-spindle of an ordinary lathe, and the plate c is provided with a central opening, h, through which the end of the tube containing the disk a can be inserted, so as to be presented to the rolls d. The rolls d are made slightly tapering, so that as the end of the tube is forced inward between them they will roll down the end of the tube around the disk a, so as to effect the welding, as shown in Fig. 8.

The operation of this form of apparatus is as follows: The shank g having been secured to the live-spindle of the lathe and the spindle set in motion so as to revolve the plates carrying the rolls d, the end of the tube, with the disk a inserted and properly heated, is passed through the opening h and pressed inward between the rolls, while the latter, rolling rapidly over the outside of the tube, rolls down its end against the disk and effects the welding. During this operation the tube is held by any suitable means, so as to be prevented from turning. If preferred, the operation may be reversed, the plates supporting the rolls being stationary, while the tube is revolved as it is presented to the rolls.

The apparatus just described for rolling down the end of the tube onto the disk is not herein claimed, as this apparatus forms the subject-matter of a companion application for Letters Patent.

What I claim is—

The herein-described method of closing the ends of metal tubes, which consists in inserting a metal disk into the end of the tube and then subjecting the end of the tube properly heated to the action of a plurality of tapering rolls, whereby it is pressed around and welded to the disk, substantially as described.

In testimony whereof I have hereunto set my hand in the presence of two subscribing witnesses.

CARLETON W. NASON.

Witnesses:
   JAS. J. KENNEDY,
   DANIEL I. O'SULLIVAN.